United States Patent [19]

Perrey et al.

[11] 4,407,724

[45] Oct. 4, 1983

[54] PROCESS FOR PRODUCING EMULSION

[75] Inventors: Hermann Perrey, Krefeld; Martin Matner, Odenthal; Ernst Schwinum, Leichlingen; Hans Rudolph, Krefeld, all of Fed. Rep. of Germany

[73] Assignee: Bayer Aktiengesellschaft, Leverkusen, Fed. Rep. of Germany

[21] Appl. No.: 252,981

[22] Filed: Apr. 10, 1981

Related U.S. Application Data

[63] Continuation of Ser. No. 669,638, Mar. 13, 1976, abandoned.

[30] Foreign Application Priority Data

Mar. 27, 1975 [DE] Fed. Rep. of Germany ....... 2513690

[51] Int. Cl.$^3$ .............................................. B01F 17/26
[52] U.S. Cl. .................................. 252/312; 252/355; 524/457; 526/911; 564/96; 564/98
[58] Field of Search .................. 252/312, 355; 564/96, 564/98

[56] References Cited

U.S. PATENT DOCUMENTS

| | | | |
|---|---|---|---|
| 2,002,613 | 5/1935 | Orthner et al. | 252/355 X |
| 2,334,186 | 11/1943 | Fox | 564/98 X |
| 2,361,322 | 10/1944 | Schroy | 523/436 |
| 3,419,494 | 12/1968 | Teeter et al. | 252/312 X |
| 3,808,272 | 4/1974 | Kerfoot et al. | 564/98 |
| 3,979,454 | 9/1976 | Perrey et al. | 564/96 |

FOREIGN PATENT DOCUMENTS

| | | |
|---|---|---|
| 753345 | 11/1952 | Fed. Rep. of Germany . |
| 864905 | 1/1953 | Fed. Rep. of Germany . |
| 1596922 | 6/1970 | France ............................ 252/355 |

OTHER PUBLICATIONS

Kirk–Othmer, Encyclopedia of Chemical Technology, Second Edition, 1969, vol. 19, pp. 507,508,550,551,552.

*Primary Examiner*—Richard D. Lovering
*Attorney, Agent, or Firm*—Sprung, Horn, Kramer & Woods

[57] ABSTRACT

Straight chain alkylsulphonic acid ethanol- and isopropanol amides are used as biodegradable non-ionogenic emulsifiers for producing an emulsion.

3 Claims, No Drawings

PROCESS FOR PRODUCING EMULSION

This is a continuation of application Ser. No. 669,638, filed Mar. 13, 1976, and now abandoned.

The present invention relates to biodegradable non-ionogenic emulsifiers with a high emulsifying effect and a wide range of applications.

For ecological reasons biodegradable emulsifiers are attaining even greater importance. Known biodegradable non-ionogenic emulsifiers include fatty acid glycerides, fatty acid esters of mono- and polysaccharides and sugar alcohols as well as alkyloxylated, especially ethoxylated natural or synthetic fatty alcohols, acids and acid amides.

However, for many applications these emulsifiers cannot prove satisfactory, since the stability of the emulsions produced with these emulsifiers or the effectiveness with regard to the required quantity of emulsifier and with regard to the emulsion production often leave much to be desired. With ethoxylated products a usable emulsifying effect is only obtained with fairly high degrees of ethoxylation. But biodegradability deteriorates with an increasing degree of ethoxylation.

The invention relates to straight chain alkyl sulphonic acid ethanol- and isopropanol amides which are biodegradable emulsifiers which do not exhibit the disadvantages mentioned.

These compounds are already known as softeners for plastics, as lubricants and leather oiling agents (DRP 753,345; DRP 864,905). It was, however, not to be expected that compounds known for these applications should possess a high emulsifying effect with a wide range of applications. The object of the invention therefore are emulsifiers having the general formula

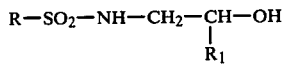

in which
R represents a straight chain alkyl radical, optionally substituted with chlorine, with 8–30 and preferably 10–20 C-atoms, and
$R_1$ represents hydrogen or methyl.

Emulsifier combinations containing alkylsulphonic acid alkanol-amides of the above formula are a further object of the invention.

The ethanol- and isopropanol-amides can be produced according to known processes from the alkyl- or chloroalkylsulphonic acid esters or preferably from the sulphonic acid chlorides by reaction with ethanolamine or isopropanolamine (see Houben-Weyl, 4th Edition, vol. IX, p 398).

The alkylsulphonic acid chlorides can be regarded as especially preferred starting materials for reaction with ethanolamine and isopropanolamine, being formed by the sulphochlorination of straight chain alkanes or chloroalkanes having 8–30 C-atoms, preferably 10 and 20 C-atoms. The individual steps of sulphochorination are familiar to all skilled men, e.g. from F. Asinger on the chemistry and technology of paraffin hydrocarbons, 1956, Akademie-Verlag-Berlin, pp. 395–474.

The production of the products according to the invention can however also be carried out from the sulphone amides, which are reacted with ethylene oxide or propylene oxide or with ethylene- or propylene chlorohydrine in a manner known from the literature to form the alkylsulphonic acid ethanol- or isopropanolamides.

The emulsifiers according to the invention are biodegradable. Depending on their carbon number they are oily-viscous or wax-like. In their pure form they are only soluble in water with some difficulty, but dissolve well in organic solvents such as methanol, ethanol, benzene, toluene, petroether, ligroine, acetone and acetic acid ester. To facilitate the usability of alkylsulfonic acid alkanol amides in water, it is possible according to a particular embodiment of the invention, to use additions of other tensides, which work with water to form a solution.

By means of this combination, the effect of the emulsifiers according to the invention can often be increased further. All conventional anion, cation-active and non-ionogenic tensides can be used here, e.g. salts of fatty acids or other surface-active carboxylates, alkylsulphates, alkylsulphonates, quaternary ammonium salts, amine oxides, esters of mono- and polysaccharides and alkoxylated alcohols, phenols, alkylphenols, alkylcarboxylic acids, alkylcarboxylic acid amides and alkylsulphonic acid amides.

These various tensides are described in detail in K. Lindner's "Tenside, Textilhilfsmittel, Waschrohstoffe", Wissenschaftliche Verlagsgesellschaft mbH, Stuttgart 1964 and are familiar to every skilled man. However, alkarylsulphonates or alkylsulphonates are used in preference, with the latter occurring to a large extent as alkali or alkanolamine salts as by-products in the production of alkanol amides and being contained in the emulsifiers according to the invention.

The production of the emulsions can be effected by the stirring together of the oily and aqueous phase with the emulsifier or by other conventional published processes (P. Becker, Emulsions: Theory and Practice, Reinhold Publishing Corp., New York, 1957, p. 209, Houben-Weyl, vol. I 2, p. 97). It proves to be of advantage here that the alkylsulphonic acid alkanolamides are soluble in organic solvents, so that they can also be applied in an organic phase. Thus the emulsifier can be prepared in the oily or aqueous phase and second phase can be stirred in. Alternatively, the emulsifier-free phase can be prepared and the emulsifier-containing oily or aqueous phase can be emulsified while stirring after the addition of the emulsifier of the invention simultaneously by stirring. Finally, it is also possible to produce the emulsions by any other feed process.

A particular advantage of the emulsifiers of the invention is that as a rule in the production of the emulsions only simple stirrers are necessary. This achieves a considerable simplification of the process in comparison with other biodegradable emulsifiers.

A further advantage relative to other emulsifiers is that emulsions produced with the alkylsulphonic acid alkanolamides have only a very slight tendency to foaming. This proves to be especially favourable when the emulsions are produced with high power or turbine stirrers, because if highfoam emulsifying systems are used with this method the foam generated is too great for practical use.

The emulsifiers according to the invention can be added in the desired quantity to the phase to be emulsified. The quantities employed are determined according to the desired emulsifying effect. It can fluctuate within wide limits and depends on the phase to be emulsified. Preferably 0.01–50% by weight, and in particular 0.1–20% by weight of alkylsulphonic acid alkanolamide-emulsifiers are used relative to the phase to be emulsified.

The emulsions produced with the alkylsulphonic acid alkanolamides according to the invention exhibit outstanding emulsion stabilities. In the event of separation due to a long period of storage, this is reversible, light stirring restores the original emulsion.

A very great variety of emulsions can be produced with the emulsifiers according to the invention. But they are preferably used in those areas in which non-ionogenic emulsifiers are described, e.g. for the emulsification of anti-aging agents, softeners and other auxiliaries for the rubber sector, of biologically effective substances in the plant protection field and of dyeing, textile and leather auxiliaries and in polymerisation technology.

The alkanolamides according to the invention can also be used as emulsifiers in emulsion polymerisation, either alone or advantageously in combination with alkali- or alkanolamine salts of alkyl or alkylarylsulphonic acids. They lead to separation-free latices without hindering radical polymerisation in the case of high monomer conversions. In cases in which with current emulsifiers no coagulate-free latices are obtained, it is possible by means of the partial replacement of the emulsifier used by the emulsifier according to the invention, to arrive at separation-free latices. In addition, higher monomer conversions are often achieved by also using the emulsifiers according to the invention in emulsion polymerisation.

Monomers for aqueous emulsion polymerisation include all radically polymerisable olefinically unsaturated compounds, e.g. mono- and diolefins, such as ethylene, propylene, butadiene, isoprene, 2-chlorobutadiene-1,3, styrene, vinyl toluene α-methylstyrene, chlorostyrene, vinylsulphonic acid and divinylbenzene; vinyl halides such as vinyl chloride and vinylidene chloride; vinyl esters of straight-chain and branched chain aliphatic carboxylic acids, such as vinyl acetate, propionate, n-butyrate, -pivalate, -laurate and -stearate; vinyl ethers such as vinylmethyl-, -ethyl-, -n-butyl- and -sec.-butylethers; esters of the acrylic and methacrylic acids of mono or polyolene, such as methylacrylate and -methacrylate, ethylacrylate and -methacrylate, butylacrylates and -methacrylates, hexylacrylates and -methylacrylates, 2-ethylhexyl-acrylate and -methacrylate, n-decylacrylate and -methacrylate, n-dodecylmethacrylate, glycolmono-acrylate and -methacrylate, butanediole-1,4-acrylate and -methacrylate, ethyleneglycol-bis-acrylate and -methacrylate and trimethylolpropane-tris-acrylate and -methacrylate; diesters and semiesters of unsaturated dicarboxylic acids, such as maleic, fumaric and itaconic acid-di- and mono-methyl-, -ethyl-, butyl- and hexylester, α,β-unsaturated di- and monocarboxylic acid, such as acrylic, methacrylic, crotonic, maleic, fumaric and itaconic acid; amides, methylolamides, and alkoxymethylamides of these α,β-unsaturated di- and monocarboxylic acids, such as acrylamide, methacrylamide, maleic acid amide, maleic acid imide, methylene-bis-acrylic and methacrylic amide; N-methylolacryl- and methacrylamide, N-methoxymethylacryl- and methacrylamide; allyl compounds such as diallylphthalate and heterocyclic compounds such as N-vinyl phthalimide, n-vinylpyrrolidone and N-vinylimidazol. The monomers can be used alone or in combination with one another.

The emulsion polymerisation can be initiated with radical forming substances, preferably with organic peroxide compounds, which are used in quantities of from 0.01 to 2% by weight, relative to monomrs. Depending on the monomer combination, in order to lower the molecular weight of the polymer, small quantities of regulators can also be used, e.g. mercaptans, halide hydrocarbons. The emulsion polymerisation is possible in two ways: the total quantity of the monomers and the greater part of the aqueous phase containing the emulsifiers can be prepared, polymerisation can be started by the addition of an initiator and in the course of polymerisation the rest of the aqueous phase can be added continuously or at intervals. It is also possible to employ the "Monomer feed" technique, by which only a part of the monomers and the aqueous phase containing the emulsifying agent are prepared and then after polymerisation is started the rest of the monomers and the aqueous phase are added evenly or at intervals according to the proportion of the reaction. The proportion of monomers added can be pre-emulsified in the aqueous phase. Both processes are known.

The following examples illustrate the invention.

EXAMPLE 1

20 g Dibenzylether were stirred with a turbo-stirrer into a mixture of 20 g water and 0.1 g of a straight chain $C_{12}$–$C_{18}$-alkylsulphonic acid isopropanolamide at room temperature. Subsequently, the mixture was re-stirred for 5–10 minutes at room temperature. The emulsion obtained was very stable and displayed no signs of separation over a period of months.

EXAMPLE 2

20 g Dibenzylether were stirred with a turbo-stirrer into a mixture of 20 g water and 0.2 g of a straight chain $C_{12}$–$C_{18}$-alkylsulphonic acid ethanolamide at room temperature. Subsequently, the mixture was re-stirred at room temperature for 5–10 minutes. The emulsion obtained was very stable and displayed no signs of separation over a period of months.

EXAMPLE 3

By stirring for 5–10 minutes with a turbo-stirrer at room temperature an emulsion was produced from 20 g toluene, 20 g water and 0.1 g of a $C_{12}$–$C_{18}$-alkylsulphonic acid ethanol- and isopropanol amide mixture in a molar ratio of 1:1. The emulsion obtained was very stable and displayed no signs of separation over a period of months.

EXAMPLE 4

20 g of a commercial spindle oil were mixed with 20 g water and 0.6 g of a straight chain $C_{12}$–$C_{18}$-alkylsulphonic acid ethanol- and -isopropanolamide mixture in a molar ratio of 1:1, and stirred at room temperature for 5–10 minutes with a turbo-stirrer. A very stable oil-in-water emulsion was obtained.

EXAMPLE 5

20 g of a mixture of aralkylated phenols (a rubber anti-ageing agent known, for example, under the tradename Vulkanox KSM, a product of Bayer AG) were added to 0.5 g of a straight chain $C_{12}$–$C_{18}$-alkylsulphonic acid ethanol- and isopropanolamide mixture in a molar ratio of 1:1 together with 20 g water. The mixture was stirred at room temperature for 5–10 minutes with a turbo stirrer. A very stable emulsion was obtained which displayed no signs of separation over a period of months.

EXAMPLE 6

200 g methacrylic acid methylester, 400 g demineralised water and 10 g of a straight chain $C_{12}$–$C_{18}$-alkylsulphonic acid ethanol amide mixture were prepared in a 2 liter three necked flask with stirrer and reflux condenser. The contents of the flask were flushed with nitrogen and then heated to 95° C. and activated with a solution of 0.2 g potassium peroxidisulphate in 100 g demineralised water. After the initiation of the reaction the mixture was stirred for half an hour and then within one hour the following solutions were added evenly at 95° C. internal temperature:
 (1) a solution of 0.4 g potassium peroxidisulphate in 100 g water; and
 (2) a solution of 0.2 g triethanolamine in 80 g water.

After the termination of the addition process the mixture was stirred for a further two hours at 95° C.

A polymer emulsion was obtained which was free of both coarse and fine coagulate. The conversion of the monomers was 95%.

EXAMPLE 7

200 g Styrene, 400 g demineralised water, 8 g Na-alkylsulphonate (mersolate K 30) and 2 g of a straight chain $C_{12}$–$C_{18}$-alkylsulphonic acid ethanolamide mixture were prepared in a 2 liter three necked flask with stirrer and reflux condenser. The contents of the flask were flushed with nitrogen and then heated to 95° C. and activated with a solution of 0.2 g potassium peroxidisulphate in 10 g demineralised water. After the initiation of the reaction the mixture was stirred for half an hour and then within one hour the following solutions were added evenly at 95° C. internal temperature:
 (1) a solution of 0.4 g potassium peroxidisulphate in 100 g water; and
 (2) a solution of 0.2 g triethanolamine in 80 g water.

After the termination of the addition process the mixture was restirred for a further two hours at 95° C.

A polymer emulsion was obtained which was free from coarse or fine precipitates and the monomer conversion was 100%. In a comparison test under otherwise identical reaction conditions, in which however no alkylsulphonic acid ethanolamide was used, 10 g mersolate K 30 being used exclusively as the emulsifier, only a 98% monomer yield was achieved. In addition, this comparison contained a larger quantity of coagulate.

EXAMPLE 8

400 g demineralised water, 5 g of a straight chain $C_{12}$–$C_{18}$-alkylsulphonic acid ethanolamide mixture and 100% of the quantity by weight of the following monomer combination of 375 g acrylic acid butyl ester, 85 g acrylonitrile, 25 g N-methoxymethyl-methacrylamide, 5 g acrylic acid and 10 g methacrylic acid were prepared in a 2 liter three necked flask with reflux condenser and stirrer. After flushing the reaction vessel with nitrogen the contents of the flask were heated to 75° C. and activated by the addition of a solution of 5 g potassium peroxidisulphate in 150 g demineralised water. The reaction started immediately. 10 minutes later the addition of the following two admixtures was begun:
 (1) the remaining 90% of the monomer mixture of the above composition
 (2) a solution of 20 g of a straight chain $C_{12}$–$C_{18}$-alkylsulphonic acid ethanolamide mixture in 170 g demineralised water. These admixtures were added evenly within 4 hours. The temperature of the reaction mixture, as during a 4 hour post reaction phase, was maintained at 75° C.

A 40% latex was obtained having a mean particle diameter of 208 mm (determined by light scatter) and a surface tension of 30 dyne/cm. The latex was free of coagulate.

We claim:

1. A process for producing an emulsion which consists essentially of emulsifying an oily phase and an aqueous phase with an emulsifier consisting of a compound of the formula

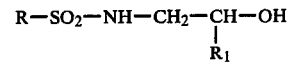

wherein
 R is straight chain alkyl having 8 to 30 carbon atoms or said alkyl substituted by chlorine and
 $R_1$ is hydrogen or methyl.

2. A process according to claim 1, wherein $R_1$ is hydrogen.

3. A process according to claim 1, wherein $R_1$ is methyl.

* * * * *